(12) United States Patent
Carmeli et al.

(10) Patent No.: US 7,937,400 B2
(45) Date of Patent: May 3, 2011

(54) DYNAMIC DISTRIBUTION OF CONTENT

(75) Inventors: Boaz Carmeli, Koranit (IL); Tzilla Eshel, D.N. Menashe (IL); Roni Ram, Yoqneam Illit (IL)

(73) Assignee: International Business Machines Corporation, Armonk, NY (US)

( * ) Notice: Subject to any disclaimer, the term of this patent is extended or adjusted under 35 U.S.C. 154(b) by 513 days.

(21) Appl. No.: 11/868,498

(22) Filed: Oct. 7, 2007

(65) Prior Publication Data

US 2009/0094279 A1  Apr. 9, 2009

(51) Int. Cl.
*G06F 7/00* (2006.01)
*G06F 17/30* (2006.01)

(52) U.S. Cl. .................................. 707/758; 707/790
(58) Field of Classification Search .............. 707/790, 707/758
See application file for complete search history.

(56) References Cited

U.S. PATENT DOCUMENTS

| | | | |
|---|---|---|---|
| 7,680,804 B2 * | 3/2010 | Upendran et al. .................. 1/1 |
| 2003/0135553 A1 | 7/2003 | Pendakur |
| 2003/0195946 A1 | 10/2003 | Yang |
| 2005/0251411 A1 * | 11/2005 | Ishii et al. ........................ 705/1 |
| 2007/0156719 A1 * | 7/2007 | Upendran et al. ............. 707/100 |
| 2008/0119177 A1 * | 5/2008 | Hovnanian et al. ......... 455/414.2 |
| 2009/0006473 A1 * | 1/2009 | Elliott et al. ............... 707/104.1 |
| 2009/0006536 A1 * | 1/2009 | Elliott et al. .................. 709/203 |

* cited by examiner

*Primary Examiner* — Cam Y Truong
*Assistant Examiner* — Michael Pham (57) ABSTRACT

Systems, methods and computer program products for information sharing are provided. In one embodiment, the method comprises generating metadata associated with content stored in a content repository accessible to a community having a plurality of members, wherein the metadata which is stored in the community's registry, is utilized by a community member to determine attributes associated with the content and its subcontents, such that the community member is provided with access to a compilation of information in the subcontents according to a category of interest and based on information in the metadata, and preferably, the community member generates more metadata which is stored in another community's registry associated with the content such that another community member is provided with access to a second compilation of information in the subcontents.

25 Claims, 5 Drawing Sheets

DYNAMIC DISTRIBUTION OF CONTENT

COPYRIGHT & TRADEMARK NOTICES

A portion of the disclosure of this patent document contains material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is for providing an enabling disclosure by way of example and shall not be construed to limit the scope of this invention to material associated with such marks.

FIELD OF INVENTION

The present invention relates generally to information management and, more particularly, to a system and method for sharing content by distributing certain information (i.e., metadata) about the content among members of one or more communities, instead of distributing the content itself.

BACKGROUND

The advent of the Internet and the electronic age has dramatically increased the volume of information that is created and shared. Large volumes of content are published and disseminated and as a result there is a growing need for improved information storage, information management and information sharing methods and systems.

Information management entails narrowly or broadly tailoring information in one or more documents so that proper information is conveyed to the intended audience. However, documents can be unnecessarily long and over-inclusive when the intention is to meet the needs of a broad audience, or in contrast, documents can be too narrowly drafted for others, when a very specific audience is in mind. As such, a high level of customization is required to prepare and deliver the proper content to the proper audience.

The above conundrum, often results in inefficiencies in an organization's information management and dissemination strategies. That is, a too narrow or a too broad approach typically results in inadvertent inclusion or exclusion of certain audience in or from the intended scope. At times, the same may lead to the creation of multiple, related documents for multiple audiences; and thus, the added burden of unnecessarily disseminating, storing, managing and sharing redundant content.

Conventional content management methods do not offer an optimized solution that is conducive to meeting today's content dissemination and sharing needs. For example, a source document may be used to generate multiple submissions to an audience that comprises a plurality of target communities. Disadvantageously, the originator of the source document not only is responsible for managing the multiple submissions and determining the proper time schedule and delivery route to all target communities, the originator has to also manage all changes in the routing, scheduling arrangements and the associated authorization restrictions and requirements for each community.

Accordingly, improved methods and systems for content management and delivery are needed that can overcome the above-mentioned shortcomings.

SUMMARY

The present disclosure is directed to systems, methods and corresponding products that facilitate creation, sharing and management of content in a hierarchical community organization based on metadata and rules associated with a content index.

For purposes of summarizing, certain aspects, advantages, and novel features of the invention have been described herein. It is to be understood that not all such advantages may be achieved in accordance with any one particular embodiment of the invention. Thus, the invention may be embodied or carried out in a manner that achieves or optimizes one advantage or group of advantages without achieving all advantages as may be taught or suggested herein.

In accordance with one embodiment, a method of information sharing is disclosed. The method comprises generating first metadata associated with first content stored in a first content repository accessible to a first community having a plurality of members, wherein the first metadata is utilized by a first community member to determine attributes associated with the first content and its subcontents, such that the first community member is provided with access to a first compilation of information in the subcontents according to a category of interest and based on information in the first metadata.

In one embodiment, the first community member generates second metadata associated with the first content such that a second community member is provided with access to a second compilation of information in the subcontents within the first content according to a category of interest and based on the second metadata. In some embodiments, the first metadata is stored in a registry centrally accessible to the first community.

In accordance with one embodiment, the second compilation of information and the second metadata are dynamically customized to conform to business rules of the first community and the needs of the second community, wherein the second metadata is stored in a second registry. In accordance with another embodiment, the first community member receives the first compilation of information in response to the first community member searching the first registry and finding the first metadata. In another embodiment, the first community member searches the first registry in response to receiving a notification that the first content is stored in the first content repository and the first metadata is stored in the first registry.

In some embodiments, a second community member receives a second compilation of information in response to a third party transmitting the second compilation of information to the second community member after searching the first registry according to the category of interest and finding the first metadata when the first content is stored in the first content repository and the first metadata is stored in the first registry.

In accordance with another embodiment, the second community member registers the category of interest with the third party so that when the first content is stored in the first content repository and the first metadata is stored in the first registry, the third party searches the first registry and finds the first metadata to determine whether any portion of the first content is to be transmitted to the second community member according to information in the first metadata. The attributes may define at least one of the nature of the first content and its subcontents and importance of the subcontents within the first content in one or more contexts, or the attributes may define access privileges to the first content and its subcontents.

In accordance with yet another embodiment, a system for information sharing is provided. The system comprising a computing system for generating first metadata associated with first content stored in a first content repository accessible to a first community having a plurality of members, wherein the first metadata is stored in the first registry and is utilized by a first community member to determine attributes associated with the first content and its subcontents, such that the first community member is provided with access to a first compilation of information in the subcontents according to a category of interest and based on information in the first metadata.

In accordance with another embodiment, a computer program product comprising a computer useable medium is provided. The computer program product comprises a computer readable program. The computer readable program when executed on a computer causes the computer to generate first metadata associated with first content stored in a first content repository accessible to a first community having a plurality of members. The first metadata is stored in the first registry and is utilized by a first community member to determine attributes associated with the first content and its subcontents, such that the first community member is provided with access to a first compilation of information in the subcontents according to a category of interest and based on information in the first metadata.

One or more of the above-disclosed embodiments in addition to certain alternatives are provided in further detail below with reference to the attached figures. The invention is not, however, limited to any particular embodiment disclosed.

BRIEF DESCRIPTION OF THE DRAWINGS

Embodiments of the present invention are understood by referring to the figures in the attached drawings, as provided below.

Features, elements, and aspects of the invention that are referenced by the same numerals in different figures represent the same, equivalent, or similar features, elements, or aspects, in accordance with one or more embodiments.

DETAILED DESCRIPTION OF EXEMPLARY EMBODIMENTS

The present disclosure is directed to systems, methods and corresponding products that facilitate dynamic content management and distribution among members of one or more communities. In exemplary embodiments, a hierarchical community order and indexing features are used to generate metadata and associate the metadata with the content stored in one or more repositories. In some embodiments, the metadata may comprise access information and authorization requirements that allow or limit distribution of content among members of said one or more communities. Content and subcontents stored in one or more repositories are thus distributed by way of sharing the metadata, instead of transmission of the content or the subcontents.

In the following, numerous specific details are set forth to provide a thorough description of various embodiments of the invention. Certain embodiments of the invention may be practiced without these specific details or with some variations in detail. In some instances, certain features are described in less detail so as not to obscure other aspects of the invention. The level of detail associated with each of the elements or features should not be construed to qualify the novelty or importance of one feature over the others.

Figure 1:
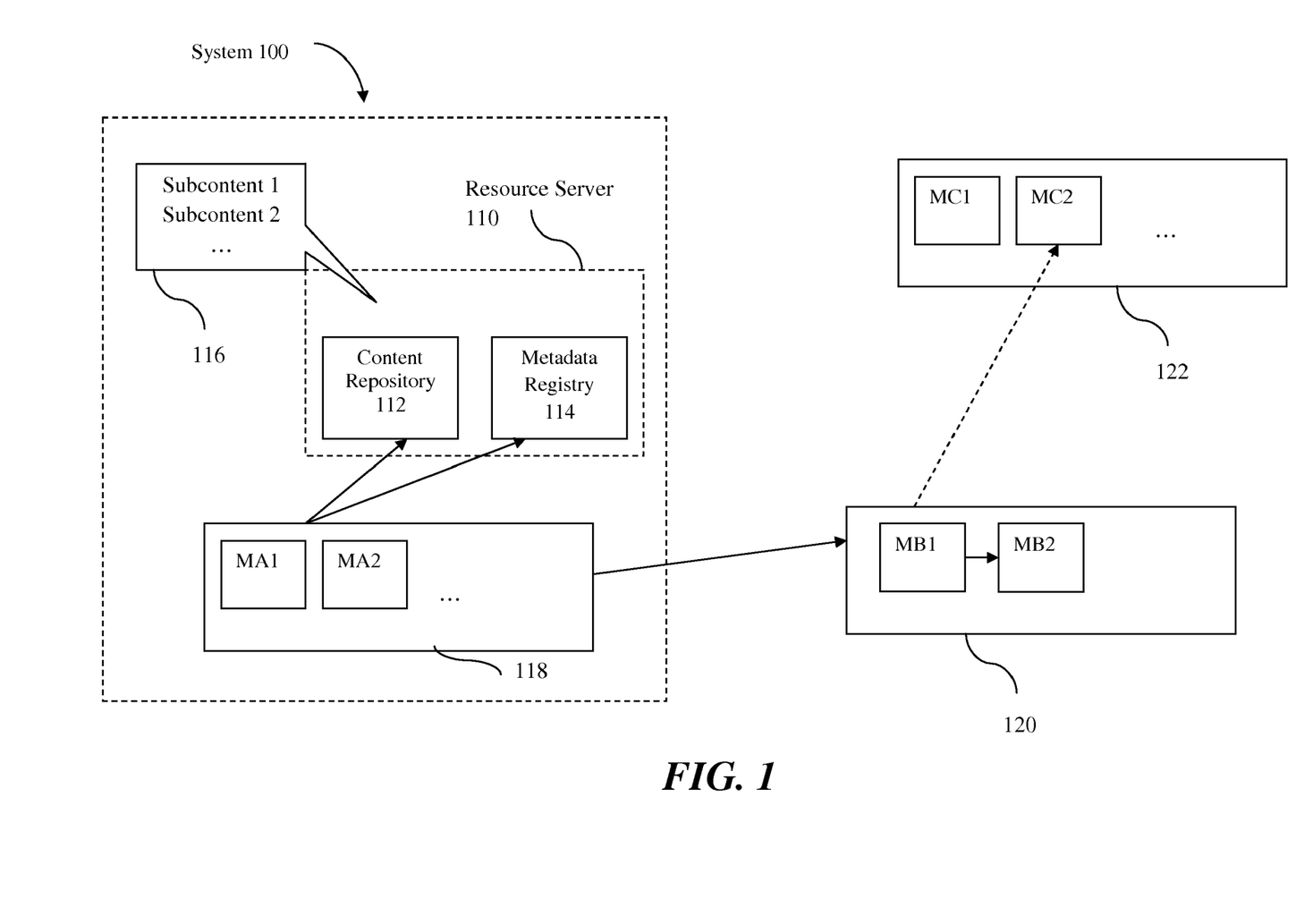
FIG. 1 is a block diagram of an exemplary system environment illustrating the flow of information between information sources and information receivers as well as associated storage components, in accordance with one or more embodiments.

Referring to FIG. 1, an exemplary information sharing, storage and management system 100 is illustrated having a resource server 110 serving a community 118, for example. In one embodiment, resource server 110 comprises content repository 112 and metadata registry 114. The resource server 110 may be implemented as a unified set of storage systems managed and operated by one or more computing systems from, preferably, a central location. Alternatively, resource server 110 may be implemented in a distributed environment, such that information stored in the content repository 112 or metadata registry 114 is stored in multiple storage systems, in a peer-to-peer network, for example.

In one embodiment, content repository 112 stores content 116, portions of which can be made accessible to one or more communities 118, 120, 122 according to information stored in metadata registry 114. Each of the above-noted communities 120 and 122 may have its own independent resource server, metadata registry or content repository (not shown). In one embodiment, content 116 comprises a plurality of subcontents (e.g., subcontent 1, subcontent 2, etc.). The subcontents may be created by a community member in said one or more communities. For example, community member MA2 in community 118 may create and store subcontent 1 in content repository 112.

In one embodiment, metadata registry 114 stores metadata about the content 116 and the respective subcontents, according to information provided by a community member that created said content or subcontents. For example, community member MA2 may create and store metadata corresponding to subcontent 1 in metadata registry 114. The metadata may comprise information about the nature of the content, access privileges to the content, the importance of certain content within one or more contexts, an index to certain keywords, subjects or categories within the content and any other information that can be used to provide or limit access to the content within said one or more communities.

Accordingly, information stored in content repository 112 for community 118 may be available for access and retrieval to one or more communities (e.g., community 120) based on metadata stored in metadata registry 114. In some embodiments, information stored in content repository 112 may be available to members of another communities through metadata registry of the other community (not shown). As noted earlier, content repository 112 and metadata registry 114 may reside in separate or common storage areas. For example, subcontent 1 and its related metadata may be stored in one or both of content repository 112 and metadata registry 114, or even in one or more computing systems associated with the community members that created the content.

Depending on implementation, metadata and subcontents may be stored in relational databases, or any other data compilation environment that can service multiple requests for data retrieval and delivery. Accordingly, certain embodiments can be implemented over a wide area computing network (e.g., the Internet), in a local area computing network, or a combination of both. As provided in more detail below, members in each community may connect to the network to access content stored in content repository 112 based on information in metadata registry 114.

Figure 2:
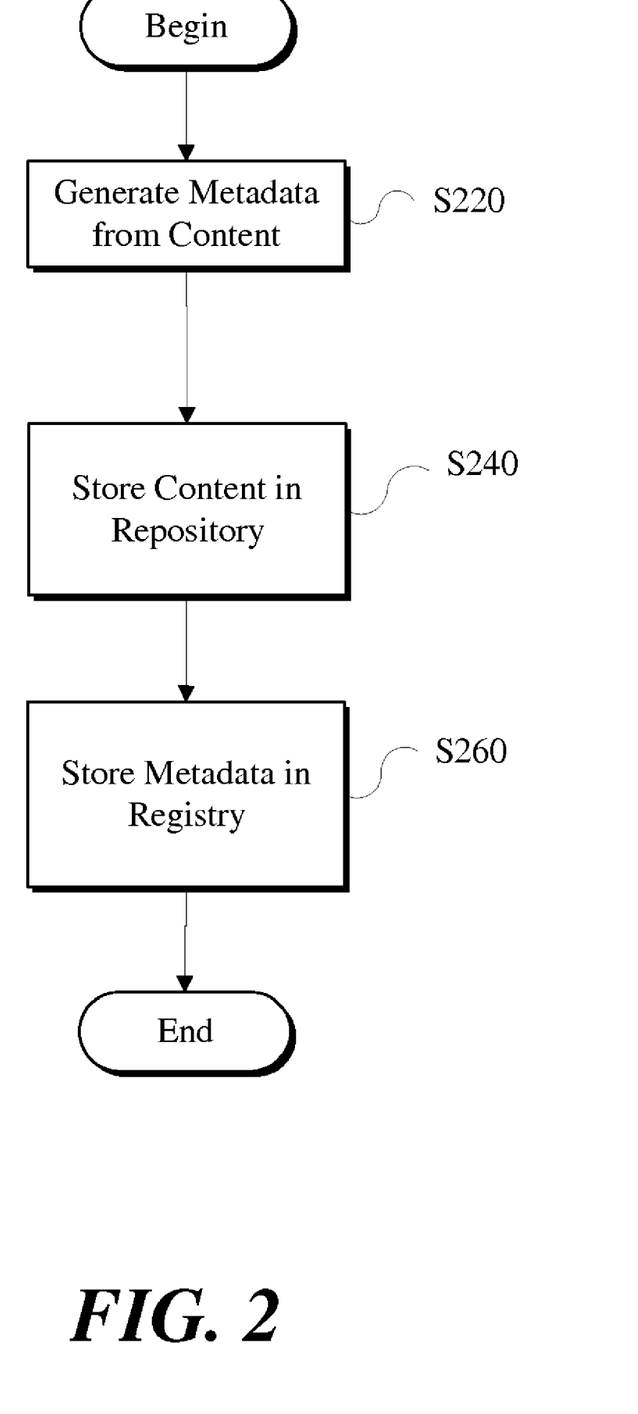
FIG. 2 is a flow diagram of a method for content management, in accordance with one or more embodiments.

Referring to FIGS. 1 and 2, metadata for a content and its subcontents may be generated and stored, in accordance with one or more embodiments, for the purpose of dynamic distribution of the content or its subcontents, preferably without the need for recompiling and retransmitting the content or subcontents among the various members of the different communities. To accomplish the above dynamic distribution scheme, the following processes are implemented without any particular emphasis on the order of performance.

In one embodiment, metadata is generated from a first content or its subcontents, for example, by the community member responsible for creating the content (S220). The content is stored in the content repository 112 (S240) and the metadata is preferably made accessible to one or more communities (e.g. communities 118, 120, 122, etc.) having a plurality of members (e.g. members $MA_1, MA_2, \ldots, MA_N$, $MB_1, MB_2, \ldots, MB_N$, $MC_1, MC_2, \ldots, MC_N$, etc.). The community members or a third party, having registry search and content retrieval capability like a community member yet acting as a mediator, can query the registry and find metadata to determine if the content or the subcontents stored in content repository 112 are suitable for further distribution to any other community.

By capturing the business rules and needs of the communities, assumptions can be made regarding the types of content or subcontent that can be distributed. Since the metadata provides information about how to access the related content or subcontents that are suitable for distribution, a community member can be given access to said content or subcontents without the need for the content or the subcontents to be actually transmitted from one computing system or storage unit to another. This results in optimized bandwidth and processing power.

For example, in an organization with a hierarchical communication structure, certain communities may require different blends of the collected information. And, the document management or confidential rules of the organization may, for example, dictate that each community is to be given access to a particular portion of the information; and that, for example, the community itself and the communities placed directly below it may know the subset of the information the community requires. The metadata generated for content in the above exemplary communication structure can be used to optimize the system and increase efficiency.

In one embodiment, during the submission process, metadata may be dynamically customized to conform to business rules of the sending community and/or the needs of the target communities, allowing for dynamic adjustment of the content to particularly suit each community of a diverse audience. For example, the metadata may be generated by a sending community member and stored in metadata registry (S260) so that the metadata can be utilized by another community member to determine attributes associated with the content and its subcontents. Accordingly, the community member may be provided with access to a compilation of information in the subcontents depending on a category of interest and based on information in the metadata.

Figure 3:
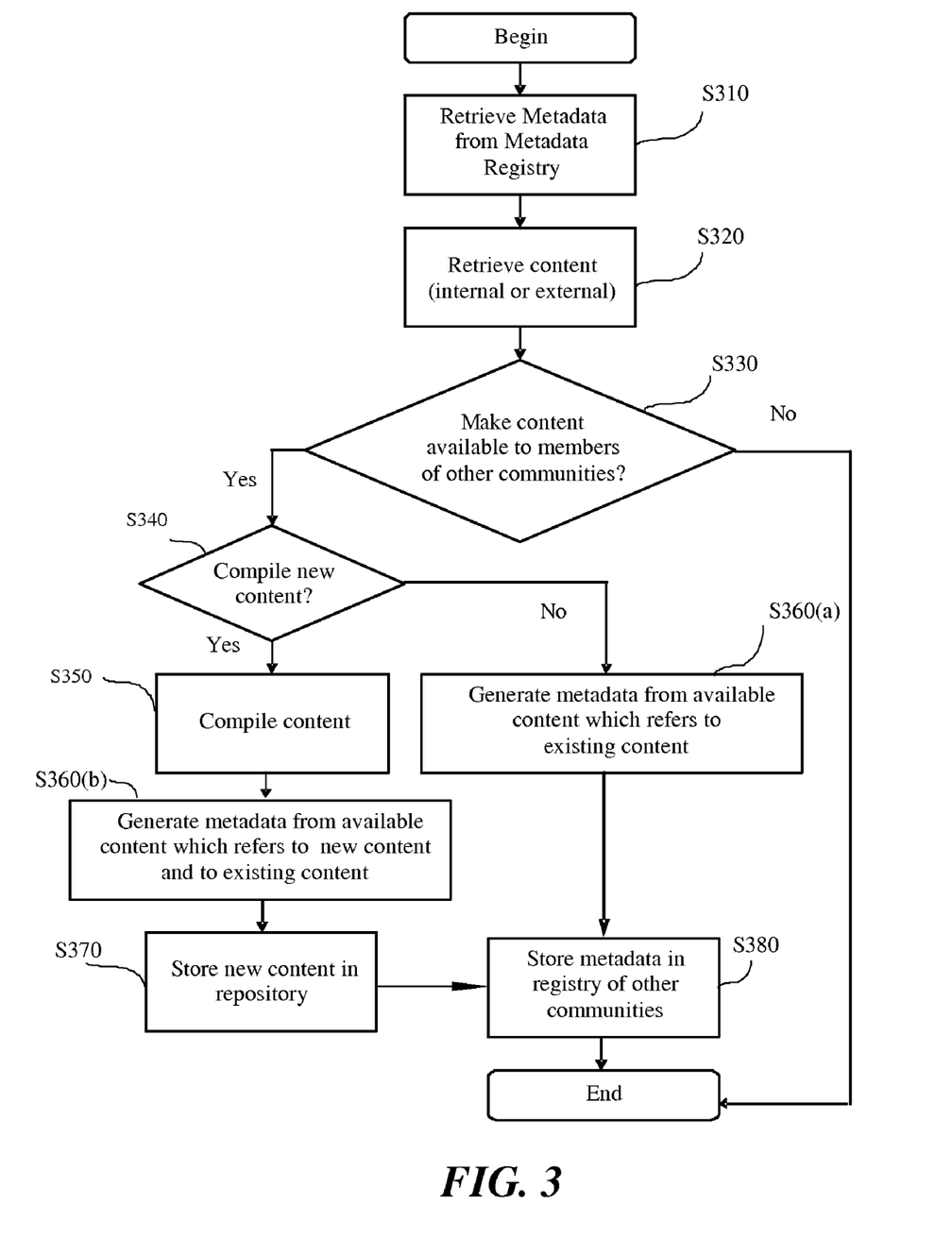
FIG. 3 is a flow diagram of an exemplary method for dynamic content distribution, in accordance with one embodiment.

Referring to FIGS. 1 and 3, an exemplary content distribution method according to one embodiment is provided. In certain embodiments, when new metadata is added to the metadata registry 114, a community member or other entity, preferably with access or search permit, retrieves metadata from the metadata registry 114 (S310). For example, a member of the communities 118, 120, 122 may perform a search of the metadata (i.e., using a pull methodology), or receive a report about the content of the metadata (e.g., by way of push methodology). Either way, one or more embodiments are implemented to notify one or more community members of the arrival of new content according to information in the metadata stored in metadata registry 114.

Thus, metadata may be analyzed by a community member to determine whether and what portions of content 116 and/or its subcontents stored in content repository 112 may be made available to another communities (S330). Based on the rules of the sending community and the needs of the target community, some members may use the metadata to create or compile additional content based on content stored in content repository 112 (S340 and S350). Depending on whether new content is generated, other members may generate metadata from available content which refers to new content and/or to existing content (S360) and preferably report new metadata from the newly compiled and available content that includes new and existing content or subcontent. The newly compiled content and newly generated metadata may be stored as new content in content repository 112 (S370). This metadata may be submitted to another community by way of providing the other community members with metadata that allows the other community members to access (e.g. on demand) targeted portions of the content or its subcontents (S380), preferably without actual delivery of the content itself.

Thus, a community member may generate metadata associated with content stored in content repository 112 and store it in the registry of another community, such that another community member is provided with access to a compilation of information in the content according to a category of interest and based on the generated metadata without the need to transfer the content from a first storage area to the next. Bandwidth and processing time are optimized in this manner because metadata (with smaller storage/transmission requirements) is communicated, instead of content (with larger storage/transmission requirements). Further, because content is compiled and reported based upon metadata that defines business rules, nature of content, access privileges or the importance of certain content within one or more contexts, content management and distribution can be automated without the need for direct or detailed human supervision.

In the following, one embodiment of the invention is provided with reference to specific details related to the healthcare industry, so that the invention can be more readily understood. It should be noted, however, that the scope of the invention should not be construed as limited to the following exemplary embodiment, as it can be applied to any data management and distribution system without limitation. Examples of such systems include human resources, finance, personal data, welfare, and any hierarchical organization.

One possible application in the healthcare domain includes using the integrating healthcare enterprises (IHE) cross-enterprise document sharing (XDS) and notification of document availability (NAV) integration profiles. IHE is an initiative by healthcare professionals and industry to improve the way computer systems in healthcare share information. IHE promotes the coordinated use of established standards to address specific clinical needs in support of optimal patient care. Systems developed in accordance with IHE communicate with one another better, are easier to implement, and enable care providers to use information more effectively.

XDS profile facilitates the registration, distribution and access across health enterprises of patient electronic health records. XDS is focused on providing a standards-based specification for managing the sharing of documents between any healthcare enterprises, ranging from a private physician office to a clinic to an acute care in-patient facility. The XDS IHE integration profile assumes that these enterprises belong to one or more clinical affinity domains. A clinical affinity domain is a group of healthcare enterprises that have agreed to work together using a common set of policies and share a common infrastructure.

The NAV IHE profile introduces a mechanism allowing notifications to be sent point-to-point to systems within a XDS affinity domain, eliminating the need for manual steps or polling mechanisms for a document consumer to be aware that documents that may be of interest have been registered with an XDS document registry actor. In the above exemplary embodiment, content submission may be implemented as provided below.

For example, an XDS document source may submit a clinical document along with its metadata to an XDS based affinity domain. Upon the registration of the new document, a notification sender sends notifications about this document and a notification receiver receives the notification. An XDS document consumer, preferably together with the notification receiver, initiates a retrieval of the metadata. Based on the metadata, the consumer retrieves the document and its references. The reference documents are linked to the document by a logical relationship and/or the metadata may point to the reference documents.

The documents are forwarded to another XDS document source (e.g., grouped with the XDS document consumer) which processes the documents. This document source decides, based on configured parameters and a set of dynamic or pre defined business rules, whether to: (1) create a new clinical document which summarizes, provides details or aggregates the retrieved documents, (2) use the existing documents, or (3) ignore the documents.

The XDS document source submits the new clinical document (if exists) along with a new metadata, which points to one or more reference documents by using a transformation relationship to an upper level XDS based affinity domain. This new metadata is dynamically created based on the business rules of the source affinity domain and the needs of the target affinity domain. This above three-prong process preferably continues until, for example, the XDS document sources decide to ignore the documents that they were notified about.

In different embodiments, the invention can be implemented either entirely in the form of hardware or entirely in the form of software, or a combination of both hardware and software elements. For example, system 100 and resource server 110 may comprise a controlled computing system environment that can be presented largely in terms of hardware components and software code executed to perform processes that achieve the results contemplated by the system of the present invention.

Figure 4:
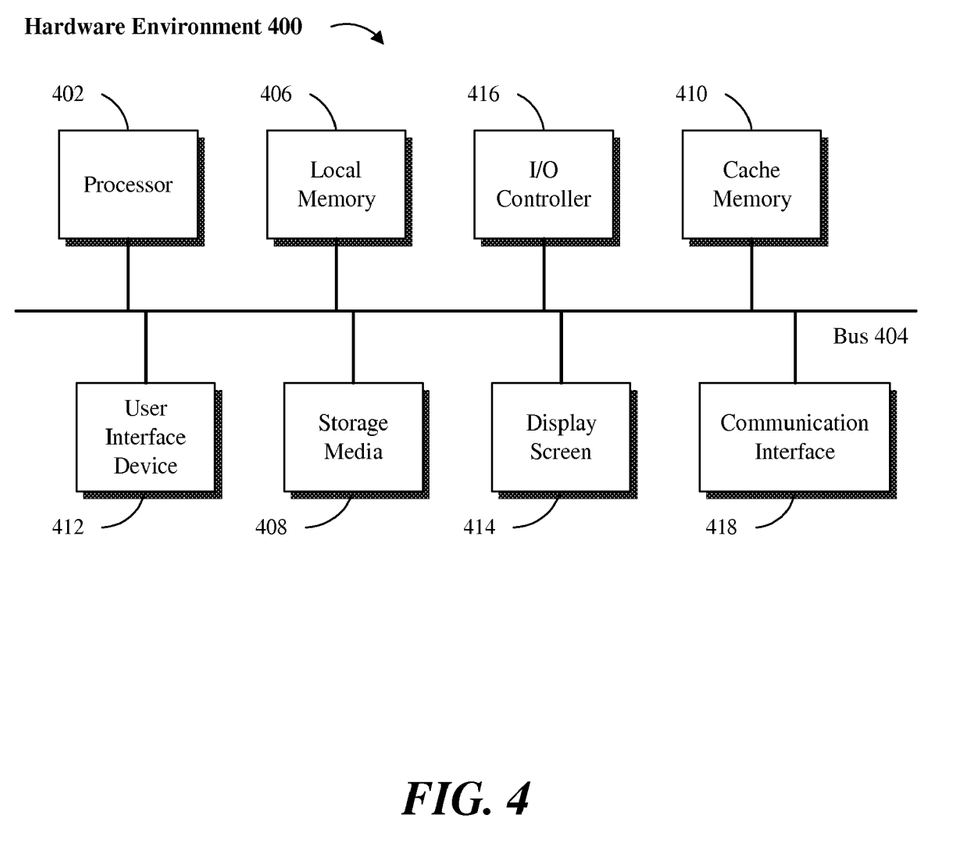
FIGS. 4 and 5 are block diagrams of hardware and software environments in which a system of the present invention may operate, in accordance with one or more embodiments.
Figure 5:
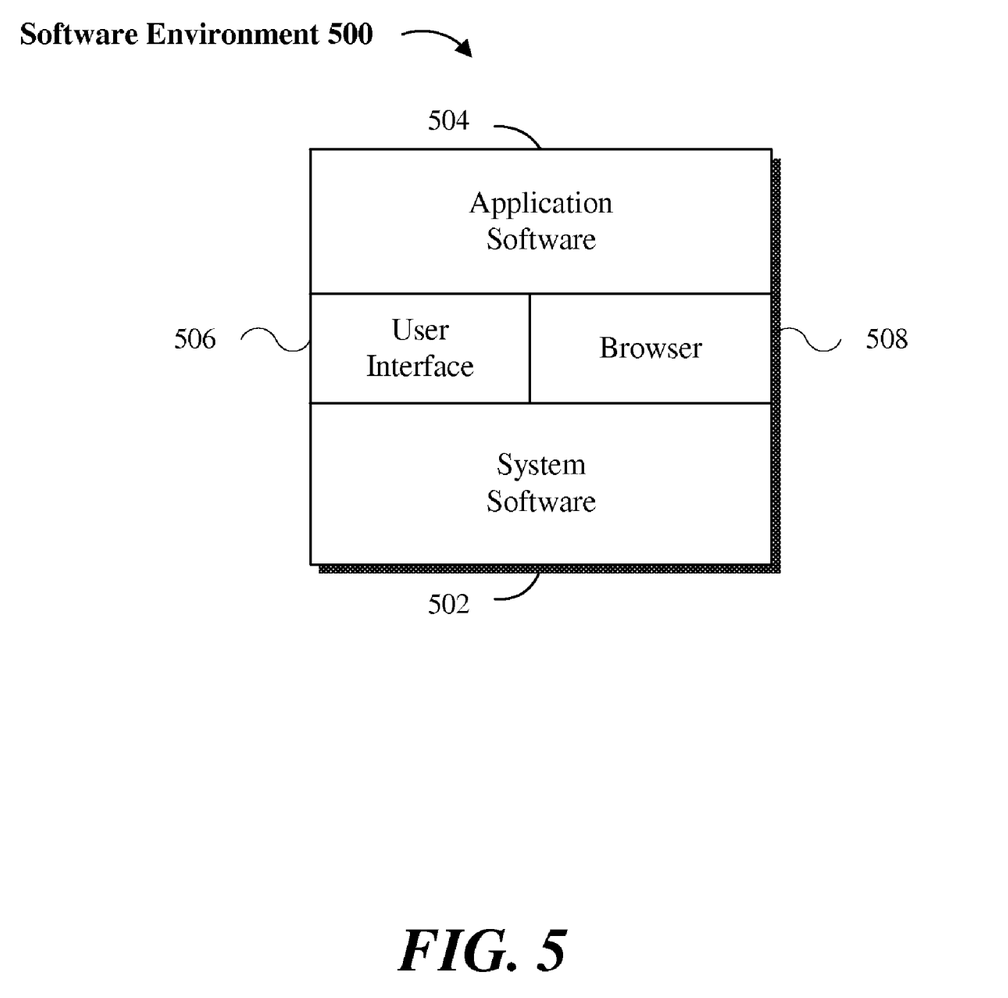

Referring to FIGS. 4 and 5, a computing system environment in accordance with an exemplary embodiment is composed of a hardware environment 400 and a software environment 500. The hardware environment 400 comprises the machinery and equipment that provide an execution environment for the software; and the software provides the execution instructions for the hardware as provided below.

As provided here, the software elements that are executed on the illustrated hardware elements are described in terms of specific logical/functional relationships. It should be noted, however, that the respective methods implemented in software may be also implemented in hardware by way of configured and programmed processors, ASICs (application specific integrated circuits), FPGAs (Field Programmable Gate Arrays) and DSPs (digital signal processors), for example.

Software environment 500 is divided into two major classes comprising system software 502 and application software 504. System software 502 comprises control programs, such as the operating system (OS) and information management systems that instruct the hardware how to function and process information.

In one embodiment, a content management and distribution software (not shown) may be implemented as system software 502 or application software 504 executed on one or more hardware environments to facilitate content and metadata generation, storage and retrieval. System software 502 and application software 504 may comprise but are not limited to program code, data structures, firmware, resident software, microcode or any other form of information or routine that may be read, analyzed or executed by a microcontroller.

In an alternative embodiment, the invention may be implemented as computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate or transport the program for use by or in connection with the instruction execution system, apparatus or device.

The computer-readable medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk read only memory (CD-ROM), compact disk read/write (CD-R/W) and digital videodisk (DVD).

Referring to FIG. 4, an embodiment of the system software 502 and application software 504 can be implemented as computer software in the form of computer readable code executed on a data processing system such as hardware environment 400 that comprises a processor 402 coupled to one or more computer readable media or memory elements by way of a system bus 404. The computer readable media or the memory elements, for example, can comprise local memory 406, storage media 408, and cache memory 410. Processor 402 loads executable code from storage media 408 to local memory 406. Cache memory 410 provides temporary storage to reduce the number of times code is loaded from storage media 408 for execution.

A user interface device 412 (e.g., keyboard, pointing device, etc.) and a display screen 414 can be coupled to the computing system either directly or through an intervening I/O controller 416, for example. A communication interface unit 418, such as a network adapter, may be also coupled to the computing system to enable the data processing system to communicate with other data processing systems or remote printers or storage devices through intervening private or public networks. Wired or wireless modems and Ethernet cards are a few of the exemplary types of network adapters.

In one or more embodiments, hardware environment 400 may not include all the above components, or may comprise other components for additional functionality or utility. For example, hardware environment 400 may be a laptop computer or other portable computing device embodied in an embedded system such as a set-top box, a personal data assistant (PDA), a mobile communication unit (e.g., a wireless phone), or other similar hardware platforms that have information processing and/or data storage and communication capabilities.

In certain embodiments of the system, communication interface 418 communicates with other systems by sending and receiving electrical, electromagnetic or optical signals that carry digital data streams representing various types of information including program code. The communication may be established by way of a remote network (e.g., the Internet), or alternatively by way of transmission over a carrier wave.

Referring to FIG. 5, system software 502 and application software 504 can comprise one or more computer programs that are executed on top of an operating system after being loaded from storage media 408 into local memory 406. In client-server architecture, application software 504 may comprise client software and server software. For example, in one embodiment of the invention, client software is executed on computing systems and server software is executed on a server system (not shown).

Software environment 500 may also comprise browser software 508 for accessing data available over local or remote computing networks. Further, software environment 500 may comprise a user interface 506 (e.g., a Graphical User Interface (GUI)) for receiving user commands and data. Please note that the hardware and software architectures and environments described above are for purposes of example, and one or more embodiments of the invention may be implemented over any type of system architecture or processing environment.

It should also be understood that the logic code, programs, modules, processes, methods and the order in which the respective steps of each method are performed are purely exemplary. Depending on implementation, the steps may be performed in any order or in parallel, unless indicated otherwise in the present disclosure. Further, the logic code is not related, or limited to any particular programming language, and may comprise of one or more modules that execute on one or more processors in a distributed, non-distributed or multiprocessing environment.

Therefore, it should be understood that the invention can be practiced with modification and alteration within the spirit and scope of the appended claims. The description is not intended to be exhaustive or to limit the invention to the precise form disclosed. These and various other adaptations and combinations of the embodiments disclosed are within the scope of the invention and are further defined by the claims and their full scope of equivalents.

What is claimed is:

1. A computer implemented method of information sharing, the method comprising:
generating first metadata associated with first content having subcontents stored in at least a first content repository accessible to a first community having a plurality of members,
wherein the first metadata is utilized by a first community member to determine attributes associated with the first content and the subcontents, such that the first community member is provided with access to a first compilation of information in the first content and the subcontents according to a first category of interest and based on information in the first metadata,
wherein the first metadata provides information about the first content and the subcontents of the first content, said information comprises attributes defining at least one or more categories of interests for the content and the subcontents;
wherein the first community member generates second metadata associated with the first content and the subcontents such that a second community member is provided with access to a second compilation of information in the first content and the subcontents according to a second category of interest and based on the second metadata, and
wherein the second metadata generated by the first community member is utilized by the second community member to determine nature of the content included in the second compilation of information without transferring the content included in the second compilation from the first content repository to a second content repository, such that bandwidth usage is optimized.

2. The method of claim 1, wherein the first community member generates second metadata associated with the first content and the subcontents such that a second community member is provided with access to a second compilation of information in the first content and the sub contents according to a second category of interest and based on the second metadata.

3. The method of claim 1, wherein the first metadata is stored in a first registry accessible to the first community.

4. The method of claim 2, wherein the second compilation of information and the second metadata are dynamically customized to conform to business rules of the first community and the needs of the second community, and wherein the second metadata is registered in a second registry.

5. The method of claim 3, wherein the first community member receives the first compilation of information in response to the first community member searching the first registry and finding the first metadata.

6. The method of claim 5, wherein the first community member searches the first registry in response to receiving a notification that the first content is stored in the first content repository and the first metadata is stored in the first registry.

7. The method of claim 1, wherein a second community member receives a second compilation of information in response to a third party searching the first metadata, the first metadata being stored in a first registry accessible to the first community, finding the first metadata and transmitting the second compilation of information to the second community member.

8. The method of claim 7, wherein the second community member registers the category of interest with the third party so that when the first content is stored in the first content repository and the first metadata is stored in the first registry, the third party searches the first registry and finds the first metadata to determine whether any portion of the first content is of interest to the second community member according to information in the first metadata.

9. The method of claim 1, wherein the attributes define at least one of nature of the first content and the subcontents and importance of the subcontents in one or more contexts.

10. The method of claim 1, wherein the attributes define access privileges to the first content and the subcontents.

11. A computing system for information sharing, the system comprising:
a memory and a processor for storing and processing information respectively;
a computing system for generating first metadata associated with first content stored in a first content repository accessible to a rust community having a plurality of members,
wherein the first metadata is utilized by a first community member to determine attributes associated with the first content and its subcontents, such that the first community member is provided with access to a first compilation of information in the subcontents according to a category of interest and based on information in the first metadata, wherein the first metadata provides information about the first content and the subcontents of the first content, said information comprises attributes defining at least one or more categories of interests for the content and the subcontents;

wherein the first community member generates second metadata associated with the first content and the subcontents such that a second community member is provided with access to a second compilation of information in the first content and the subcontents according to a second category of interest and based on the second metadata, and wherein the second metadata generated by the first community member is utilized by the second community member to determine nature of the content included in the second compilation of information without transferring the content included in the second compilation from the first content repository to a second content repository, such that bandwidth usage is optimized.

12. The system of claim 11, wherein the first community member generates second metadata associated with the first content such that a second community member is provided with access to a second compilation of information in the subcontents within the first content according to a category of interest and based on the second metadata.

13. The system of claim 11, wherein the first metadata is stored in a first registry accessible to the first community.

14. The system of claim 12, wherein the second compilation of information and the second metadata are dynamically customized to conform to business rules of the first community and the needs of the second community.

15. The system of claim 11, wherein a second community member receives a second compilation of information in response to a third party transmitting the second compilation of information to the second community member after searching the first metadata, the first metadata being stored in a first registry accessible to the first community, according to the category of interest and finding the first metadata when the first content is stored in the first content repository.

16. A computer program product comprising a non-transitory computer readable medium having a computer readable program, wherein the computer readable program when executed on a computer causes the computer to:

generate first metadata associated with first content stored in a first content repository accessible to a first community having a plurality of members, wherein the first metadata is utilized by a first community member to determine attributes associated with the first content and its subcontents, such that the first community member is provided with access to a first compilation of information in the subcontents according to a category of interest and based on information in the first metadata, wherein the first metadata provides information about the first content and the subcontents of the first content, said information comprises attributes defining at least one or more categories of interests for the content and the subcontents;

wherein the first community member generates second metadata associated with the first content and the subcontents such that a second community member is provided with access to a second compilation of information in the first content and the subcontents according to a second category of interest and based on the second metadata, and wherein the second metadata generated by the first community member is utilized by the second community member to determine nature of the content included in the second compilation of information without transferring the content included in the second compilation from the first content repository to a second content repository, such that bandwidth usage is optimized.

17. The computer program product of claim 16, wherein the first community member generates second metadata associated with the first content such that a second community member is provided with access to a second compilation of information in the subcontents within the first content according to a category of interest and based on the second metadata.

18. The computer program product of claim 16, wherein the first metadata is stored in a first registry accessible to the first community.

19. The computer program product of claim 17, wherein the second compilation of information and the second metadata are dynamically customized to conform to business rules of the first community and the needs of the second community.

20. The computer program product of claim 16, wherein a second community member receives a second compilation of information in response to a third party transmitting the second compilation of information to the second community member after searching the first metadata, the first metadata being stored in a first registry accessible to the first community, according to the category of interest and finding the first metadata when the first content is stored in the first content repository.

21. The method of claim 1, wherein the shared information comprises financial information.

22. The method of claim 1, wherein the shared information comprises personal information.

23. The method of claim 1, wherein the shared information comprises data related to hierarchical organizations.

24. The method of claim 1, wherein the shared information comprises data used in healthcare industry.

25. The method of claim 1, wherein the shared information comprises data used in welfare industry.

* * * * *